United States Patent [19]
Salvati

[11] Patent Number: 6,097,848
[45] Date of Patent: Aug. 1, 2000

[54] NOISE REDUCTION APPARATUS FOR ELECTRONIC EDGE ENHANCEMENT

[75] Inventor: Jon R. Salvati, Skaneateles, N.Y.

[73] Assignee: Welch Allyn, Inc., Skaneateles Falls, N.Y.

[21] Appl. No.: 08/963,337

[22] Filed: Nov. 3, 1997

[51] Int. Cl.⁷ .................................................. H04N 1/40
[52] U.S. Cl. .......................................... 382/266; 382/199
[58] Field of Search ............................ 382/199, 266–269

[56] References Cited

U.S. PATENT DOCUMENTS

| | | | |
|---|---|---|---|
| 3,188,386 | 6/1965 | Byatt | 178/6.8 |
| 3,623,126 | 11/1971 | Newhouse | 178/7.2 |
| 3,783,190 | 1/1974 | Gaebele | 178/7.5 R |
| 3,845,242 | 10/1974 | Richeson, Jr. et al. | 178/6 |
| 3,980,819 | 9/1976 | Schwartz | 178/7.5 R |
| 4,758,891 | 7/1988 | Hitchcock et al. | 358/166 |
| 4,777,385 | 10/1988 | Hartmeier | 307/263 |
| 4,969,034 | 11/1990 | Salvati | 358/98 |
| 5,369,446 | 11/1994 | Parker et al. | 348/625 |

*Primary Examiner*—Thomas D. Lee
*Assistant Examiner*—Stephen Brinich
*Attorney, Agent, or Firm*—Wall Marjama Bilinski & Burr

[57] ABSTRACT

A video signal processor includes an edge enhancement determining circuit that senses the amount of some characteristic of that signal which provides a measure of noise inherent in the signal, precisely determines a preferred amount of edge enhancement to be applied to a video signal as a function of that characteristic, and applies that amount of edge enhancement to the video signal. The video signal characteristic, used to determine the noise content of the video signal includes the amount of automatic gain control amplification and the brightness of the viewed scene. Thus, the amount of edge enhancement added to the video signal is adaptively controlled according to the brightness level of the viewed scene and the amplification level of the video signal by the automatic gain control circuit, and provides the proper amount of edge sharpness to the viewed video scene as a function of its noise content. This provides an increase in perceived sharpness of the viewed image, without an increase in background noise that occurs in conventional non-adaptive systems.

3 Claims, 4 Drawing Sheets

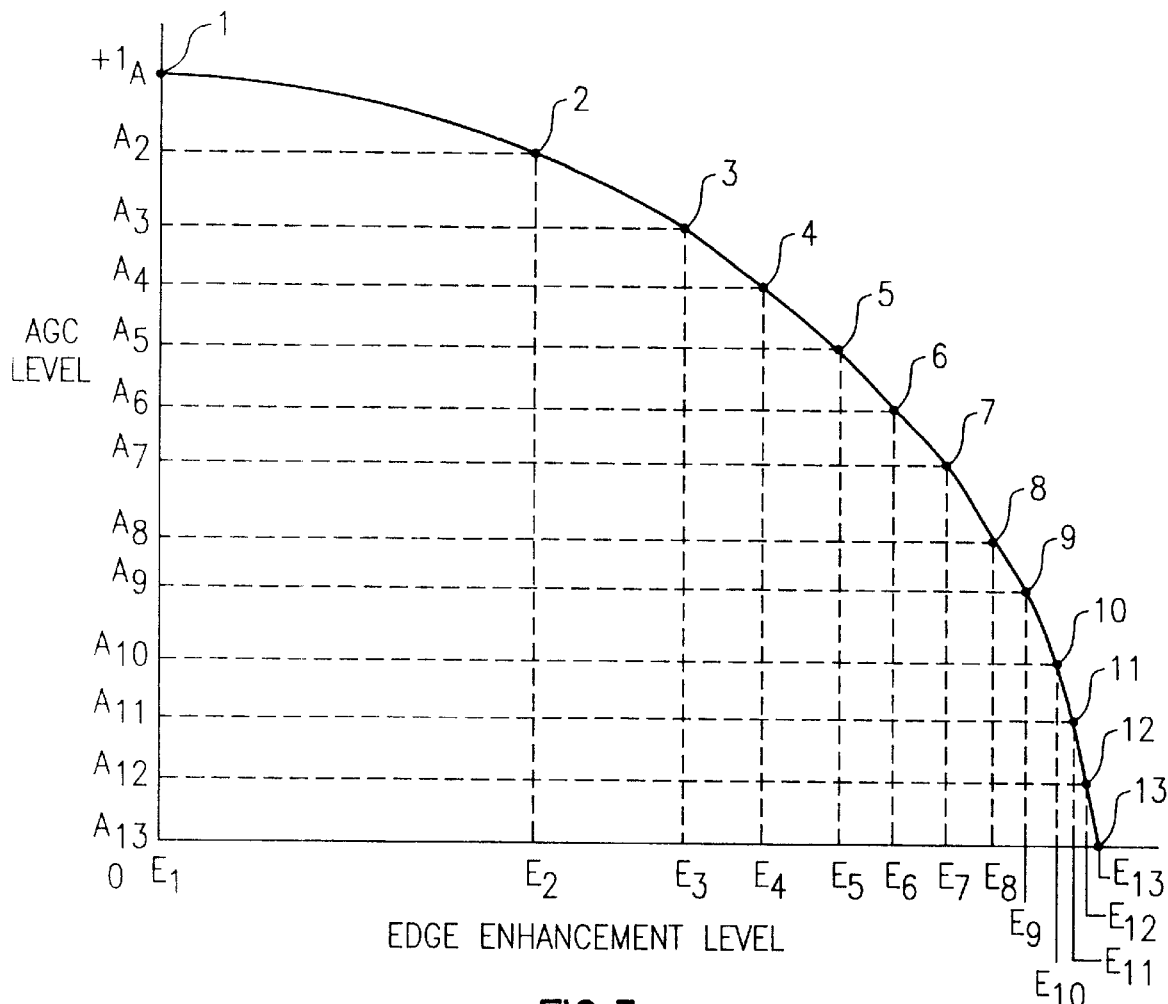

NOISE REDUCTION APPARATUS FOR ELECTRONIC EDGE ENHANCEMENT

BACKGROUND OF INVENTION

This invention pertains to video signal processors, and in particular to an edge enhancement circuit that dynamically adjusts the amount of edge enhancement in accordance with alternatively the amount of automatic gain control applied to the video signal processor's input video signal or to the brightness level of the video signal.

A basic approach to improving the perceived sharpness of a displayed image corresponding to a viewed scene (a video signal), is to create and subsequently add an enhancement or peaking signal to the original video signal. The addition of such an enhancement signal makes the rise in a transition from a dark image region to a light image region, or alternatively the fall in a transition from a light image region to a dark image region, more steep. A circuit that performs this enhancement function is known as an edge enhancement circuit.

These enhancement signals are conventionally generated by increasing the amplitudes of the high frequency components of the video signal to steepen the positive and negative slopes of the original video signal. This steepening is variously performed by taking a first or second derivative of the original video signal, and appropriately adding or subtracting that derivative to the original video signal, or forming a peaking signal by subtracting from the original video signal a delayed video signal and appropriately adding or subtracting that peaking signal to the original video signal.

A problem in edge enhancement is that in a low light level situation, the high frequency components of an original video signal contain a disproportionate quantity of noise. Edge enhancement compensation boosts the resultant noise level to an unfavorable magnitude. An additional and related problem is that in a video processing circuit with automatic gain control, the darker viewed scenes undergo an automatic gain control amplification that boosts the noise in the resultant video signal. Thus, in a low light level video signal, and particularly in a low light video signal enhanced by automatic gain control; edge enhancement, while sharpening the transition areas of a displayed image, at the same time increases the unwanted and sometimes objectionable noise in the low light level scenes.

For each viewed scene, there is a preferred combination of the amount of edge enhancement for the brightness of the scene and the magnitude of the automatic gain control amplification applied to the video signal.

No prior edge enhancement circuit dynamically and adaptively adjusts the amount of edge enhancement.

No prior art edge enhancement circuit dynamically adjusts the amount of edge enhancement in response to the brightness of the scene or the magnitude of the automatic gain control amplification applied to the video signal.

No prior art edge enhancement circuit precisely adjusts the amount of edge enhancement as a predetermined function of the brightness of the viewed scene and the amount of automatic gain control amplification applied to the video signal to achieve a preferred amount of edge enhancement for a given amount of scene brightness and automatic gain control amplification.

SUMMARY OF INVENTION

It is an object of this invention to provide an edge enhancement circuit that dynamically adjusts the amount of edge enhancement.

It is a further object of this invention to provide an edge enhancement circuit that dynamically adjusts the amount of edge enhancement adaptively as a function of some characteristic of the viewed scene or corresponding video signal.

It is a still further object of this invention to provide an edge enhancement circuit that dynamically provides the preferred amount of edge enhancement to a video signal for the brightness of the viewed scene and the amount of automatic gain control signal amplification.

It is a yet still further object of this invention to provide an edge enhancement circuit that provides a precisely adjusted preferred amount of edge enhancement to a video signal as a predetermined function of the brightness of the viewed scene and the amount of automatic gain control amplification applied to the video signal.

Briefly stated, a video signal processor includes an edge enhancement determining circuit that senses the value of some characteristic of that signal, precisely determines a preferred amount of edge enhancement to be applied to a video signal as a function of the values of that characteristic, and applies that amount of edge enhancement to the video signal. The video signal characteristics that are monitored to determine the noise content of the video signal include the amount of automatic gain control amplification and the brightness of the viewed scene. Thus, the amount of edge enhancement added to the video signal is adaptively controlled according to the brightness level of the viewed scene and the amplification level of the video signal by the automatic gain control circuit, and provides the proper amount of edge sharpness to the viewed video signal as a function of its noise content.

According to an embodiment of the present invention, an electrical imaging circuit for producing an electrical signal corresponding to a viewed scene includes a means for dynamically defining an amount of edge enhancement to apply to the electrical signal according to a characteristic of the electrical signal, and a means for providing that amount of edge enhancement to the electrical signal. That characteristic may be the magnitude of the electrical signal, which is representative of the brightness of the viewed scene, and moreover may be the amount of automatic gain control amplification applied to the electrical signal by an imaging circuit having automatic gain control. Furthermore, the defined amount of edge enhancement may be determined by a precise functional relationship including a computation by a programmed computer of an equation determining the amount of edge enhancement as a function of that characteristic, or alternatively by an access by a circuit of a predetermined tabular relationship stored on a memory device that is accurate to an arbitrary range of precision.

The above, and other objects, features and advantages of the present invention will become apparent from the following description read in conjunction with the accompanying drawings, in which like reference numerals designate the same elements.

DESCRIPTION OF FIGURES

FIG. 3 graphically portrays an exemplary preferred relationship between Automatic Gain Control level and edge enhancement level.

FIG. 4 tabularly portrays the exemplary preferred relationship of FIG. 3 between the Automatic Gain Control level and the edge enhancement level for Automatic Gain Control levels.

DESCRIPTION OF PREFERRED EMBODIMENT

Figure 1:
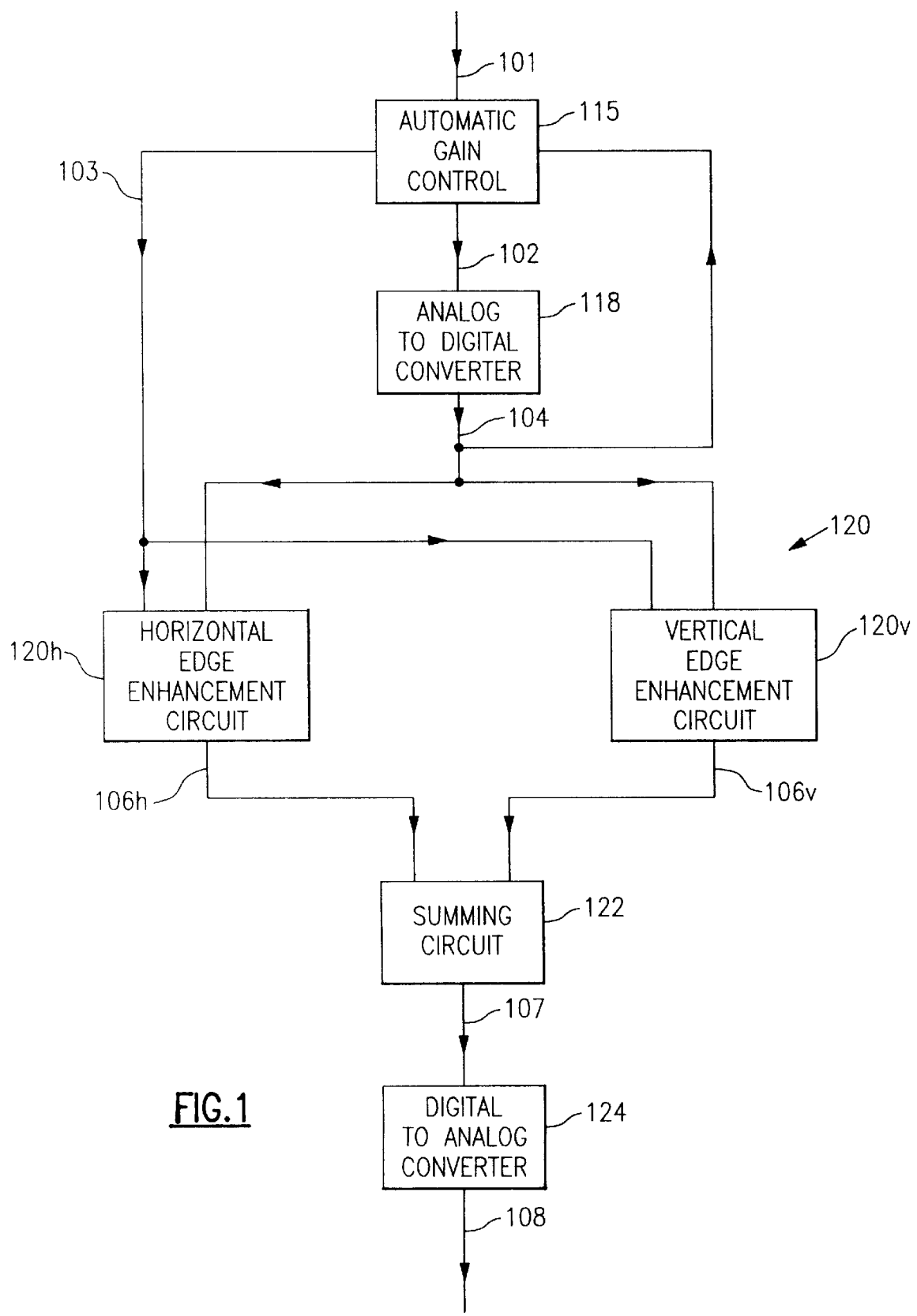
FIG. 1 portrays a functional diagram of an electrical imaging circuit for producing an electrical signal with both automatic gain control and edge enhancement.

Referring to FIG. 1, an imager (not shown) outputs an analog electrical signal 101 corresponding to an imaged object scene, conventionally a video signal, into an automatic gain control (AGC) circuit 115. The AGC circuit 115 conventionally maintains the level of its output video signal 102 in inverse proportion to the input signal 101 by monitoring a digitized video signal 104 and performing a magnitude detection and filter function, creating a digital representation 103 of the magnitude of video signal 101. The video output of the AGC circuit 115 is a video signal 102. The video output of AGC circuit 115 is electrically connected to an analog to digital converter (ADC) circuit 118. The ADC circuit 118 conventionally transforms analog video signal 102 into the digital video signal 104. Digital signal 104 comprises a sequence of words, each word consisting of the binary pulses corresponding to the magnitude of the signal 102 at a pixel. Signal 104 is accordingly a digitized video signal whose output level has been adjusted by an automatic gain control circuit.

The output of the ADC circuit 118 is electrically connected to an edge enhancement circuit 120, comprising a vertical edge enhancement circuit 120v in parallel with a horizontal edge enhancement circuit 120h. The vertical edge enhancement circuit 120v outputs a preferred amount of vertical edge enhancement signal 106v as a predetermined function of the digital representation of the magnitude of the video signal 103, and the horizontal edge enhancement circuit 120h similarly outputs a preferred amount of horizontal edge enhancement signal 106h as a predetermined function of the digital representation of the magnitude of the video signal 103, in a manner presently described.

Figure 2:
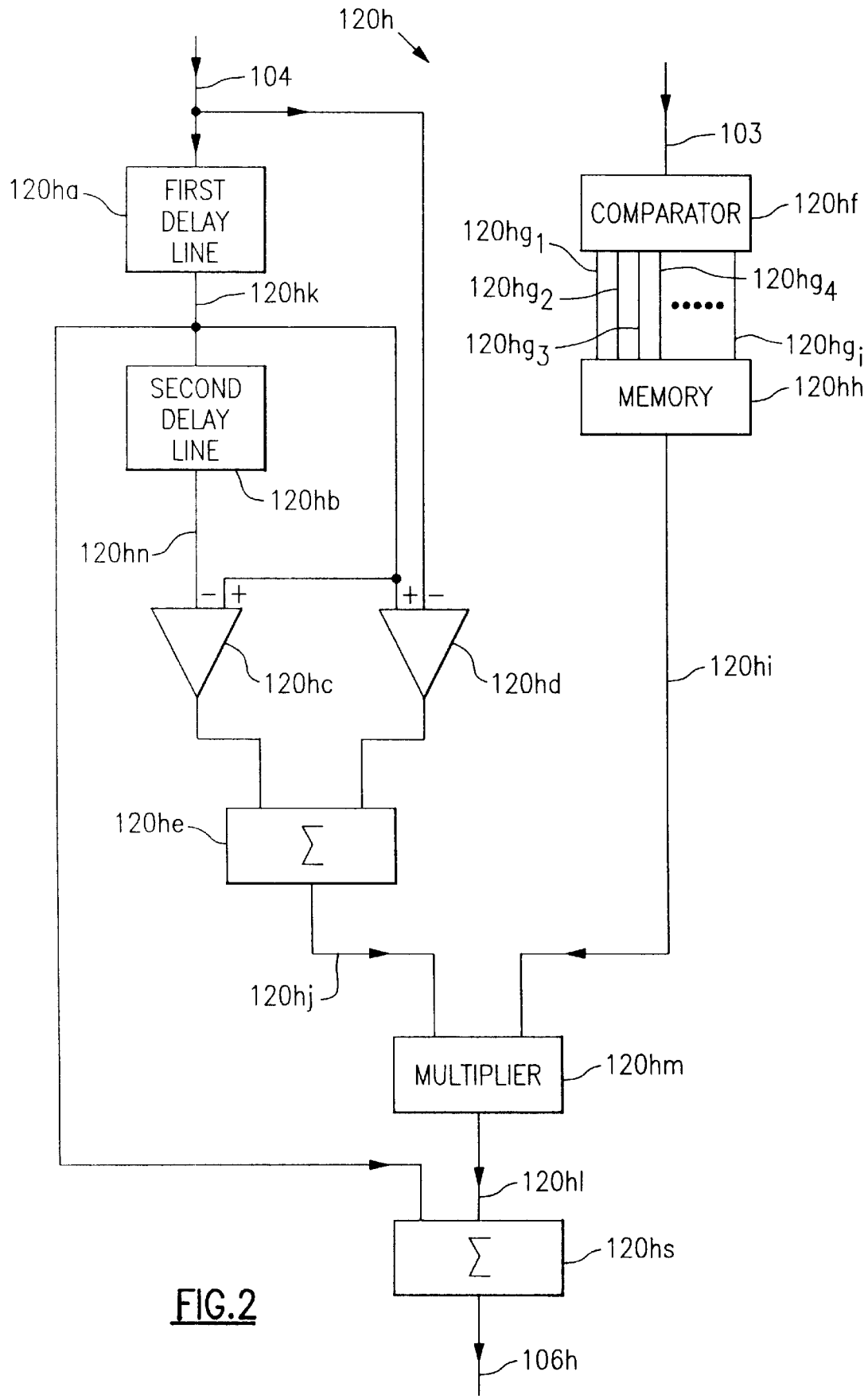
FIG. 2 portrays an adaptive edge enhancement circuit that provides edge enhancement as a function of a characteristic of the video signal, in this case the magnitude of automatic gain control.

Referring to FIG. 2, horizontal edge enhancement circuit 120h includes a first delay line circuit 120ha, whose input is electrically connected to the output of the ADC circuit 118 and is accordingly video signal 104, and whose output is a once time-delayed horizontal video signal 120hk; the second delay line circuit 120hb whose input is the output of the first delay line 120ha and is accordingly the once time-delayed horizontal video signal 120hk and whose output is accordingly a twice time-delayed horizontal video signal 120hn; a first operational amplifier 120hc wired as a subtractor whose plus input is electrically connected to the output of the first delay line 120ha and whose minus input is electrically connected to the output of the second delay line 120hb, and accordingly subtracts the twice time-delayed vertical video signal 120hn from the once time-delayed video signal; a second operational amplifier 120hd wired as a subtractor whose plus input is electrically connected to the output of the first delay line 120ha and whose minus input is electrically connected to the output of the AGC circuit 118, and accordingly subtracts the video signal 104 from the once time-delayed vertical video signal 120hk; and a first summing circuit 120he with two input lines, one electrically connected to the output of the first operational amplifier 120hc and the other electrically connected to the output of the second operational amplifier 120hd, whose output signal is the electrical sum of its inputs. The time-delay of the delay lines 120ha and 120hb is the time period between consecutive display pixels. That time-delay ranges from approximately 70 ηs (for a 768 pixel display line) to approximately 100 ηs (for a 512 pixel display line). The first delay line circuit 120ha, the second delay line circuit 120hb, the first operational amplifier subtractor 120hc, the second operational amplifier subtractor 120hd, and the first summing circuit 120he, together in combination conventionally provide a second derivative of the input video signal according to conventional delay line techniques. The output signal of the first summing circuit 120he has a value of the second derivative along a display horizontal axis and represents a full horizontal edge enhancement signal 120hj.

The full horizontal edge enhancement signal 120hj is reduced by a precise preselected amount corresponding to a measure of the applied AGC to the video signal 102. A digital comparator circuit 120hf is electrically connected to the AGC circuit 115 to accept as an input the digital signal 103, representing the measure of the applied AGC to video signal 102. Digital comparator circuit 120hf comprises a series of comparators that associate each digital value of signal 103 with a specific address in a non-volatile memory device 120hh. The output of the comparator circuit 120hf are individual address lines 120hg, through 120hgi, each going to a different address of memory device 120hh to initiate a readout of the corresponding memory address's word content on output line 120hi. The content of each memory address in memory device 120hh is a digital representation of the proportionate amount that the full horizontal edge enhancement signal 120hj is to be reduced commensurate with the magnitude of the digital signal 103 characteristic, which in this embodiment is itself proportional to the amount of AGC applied to the video signal 101, and the brightness level of the viewed scene.

Referring to FIG. 3, the precise proportionate amount that the full horizontal edge enhancement signal 120hj is reduced is represented graphically for thirteen applied AGC levels as data points 1 through 13, where the applied AGC level of each data point is represented by its Y axis value, and the preferred edge enhancement level of each data point is represented by its X axis value. Referring to FIG. 4, those same data points 1 through 13 are represented tabularly. Each AGC level value is associated with a specific memory address location, and the corresponding edge enhancement level of the table is stored at that memory address location. The relationship between AGC level and edge enhancement level may be according to any desired level of precision. It is possible to represent a range of feasible AGC levels with one edge enhancement level. It is also possible to represent the relationship between applied AGC level and preferred edge enhancement level as an analytic function, such as a conic equation:

$$\text{edge enhancement level} = [\text{constant} - (\text{AGC level})^2]^{1/2}.$$

The relationship between applied AGC level and edge enhancement level may also be derived from a human factors test and analysis of the edge enhancement level preferences over a range of AGC levels, of a population of video signal users skilled in the display requirements of a specific video signal application, for exemplary viewed scenes. The human factors approach to derivation of the AGC level - edge enhancement level relationship is the preferred embodiment of this invention. The human factors derived relationship lends itself naturally to a tabular relationship of AGC level and edge enhancement level. It is understood that any characteristic of the video signal may be measured and related to a preferred edge enhancement level in the matter described herein. The AGC level takes into account both the brightness of the viewed scene and the AGC amplification applied to the video signal.

Referring again to FIG. 2, a multiplier circuit 120*hm* that performs a multiplication of the digital value of its inputs is electrically connected to the output of the first summer 120*he* and the memory 120*hh*, thus multiplying the full horizontal edge enhancement signal 120*hj* by the proportionate edge enhancement level multiplier 120*hi* to yield as its output a horizontal edge enhancement signal 120*hl* that is the predetermined preferred amount of horizontal edge enhancement corresponding to the brightness of the viewed scene and the amount of AGC video signal amplification. A summer circuit 120*hs* combines video signal 120*hk* and edge enhancement signal 120*hl* to output a horizontally corrected video signal 106*h*. The once time delayed horizontal signal 120*hk* is preferably used as an input to be summed with the horizontal edge enhancement signal 120*hl*, rather than the video signal 104, to thus center the edge enhancement signal about the midpoint of an edge transition.

The vertical edge enhancement circuit 120*v* and the horizontal edge enhancement circuit 120*h* differ only in the time-delays of their respective line delay circuits and the preferred AGC level - edge enhancement relationship. In the case of the vertical edge enhancement circuit 120*v*, that time-delay is approximately 63.5 $\mu$s for a 60 Hz scan rate, representing the time between successive video signal horizontal display lines. A description of the operation of the vertical edge enhancement circuit 120*v* is omitted because its description is identical to that of the horizontal edge enhancement circuit 120*h*. The vertical first time-delay circuit (not shown) has its own non-volatile memory (not shown) storing digital values corresponding to the proportionate amount of vertical edge enhancement to be applied to a horizontally corrected signal (not shown). The vertical edge enhancement circuit 120*v* outputs a vertical edge enhancement signal 106*v* that is the predetermined preferred amount of vertical edge enhancement added to the video signal that corresponds to the brightness of the viewed scene and the amount of AGC video signal amplification.

It is understood that the comparator and the memory of both the vertical and the horizontal edge enhancement circuits for determining the amount of edge enhancement to apply to the video signal may be implemented with a circuit that includes a programmed computer. In such an implementation, the computer responds to a program that includes instructions that alternatively direct the computer to calculate an analytic function for solving for a preferred level of edge enhancement level as a function of AGC level, or access an edge enhancement level from a table in computer memory that relates AGC level to a preferred edge enhancement level.

Referring again to FIG. 1, the preferred vertically enhanced signal 106*v* and the preferred horizontally enhanced signal 106*h*, are each presented as inputs to a summing circuit 122 where they are summed to output a vertical and horizontal edge enhanced digital video signal 107. The output of the summing circuit 122 is electrically connected to a digital to analog converter (DAC) circuit 124. The output of the DAC circuit 124 is accordingly an adaptively adjusted edge enhanced analog video signal 108 of a preferred amount of edge enhancement.

The edge enhancement determining circuit of this invention may also be adapted to a conventional video processing circuit by having the edge enhancement determining circuit monitor a video signal characteristic of the video processing circuit, determine the preferred amount of edge enhancement according to the value of that monitored characteristic, and output a signal representative of the preferred edge enhancement to the edge enhancement circuit for application of that proportionate amount to the video signal, or alternatively apply that proportionate amount to the video signal itself in the manner described with reference to FIG. 2.

Figure 5:
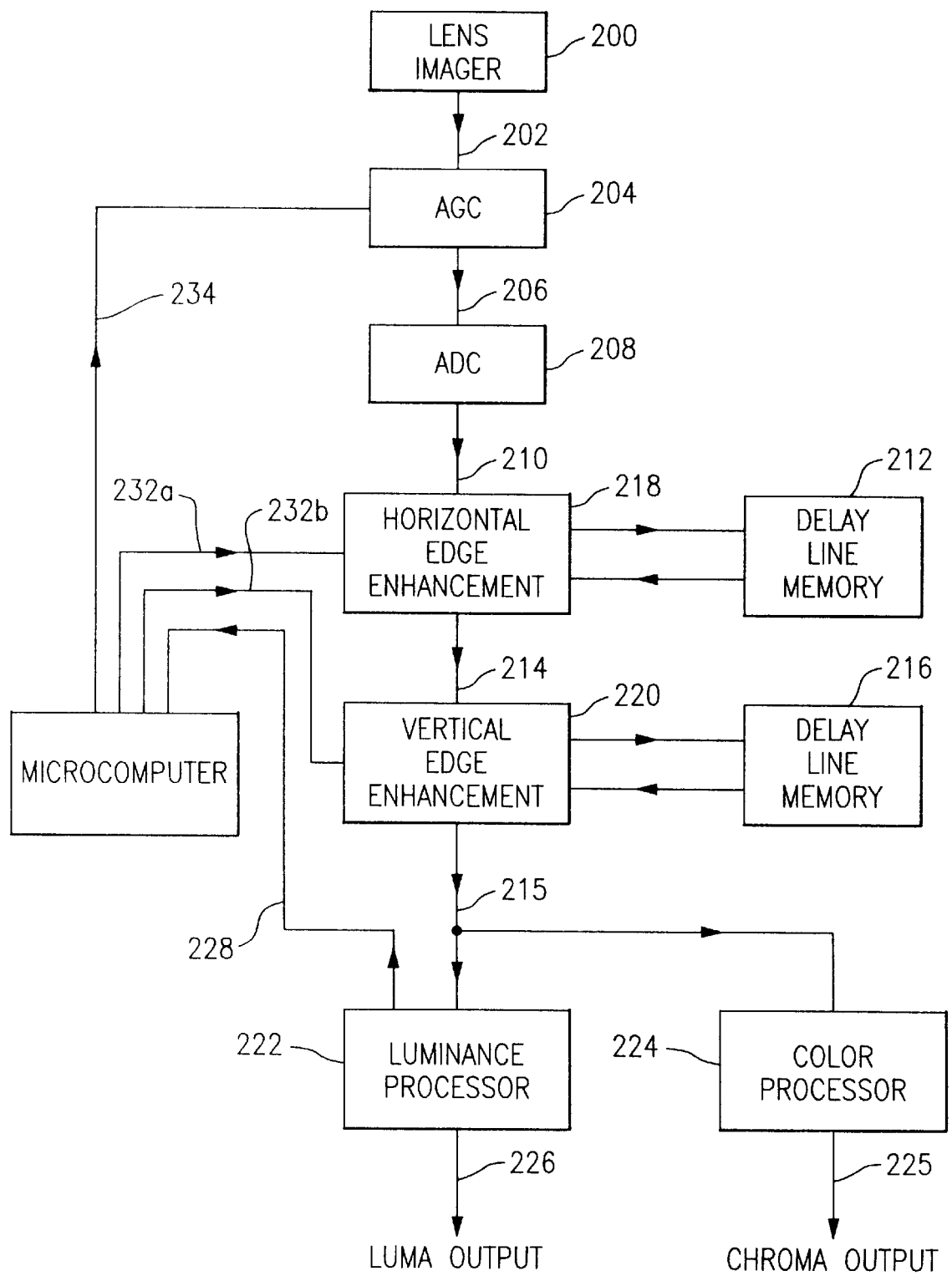
FIG. 5 portrays a functional diagram of a conventional commercially available digital video processing circuit in cooperation with an edge enhancement determining circuit implemented as program instructions and data in the microcomputer of the conventional digital video processor circuit. The preferred embodiment digital video processing circuit includes the functional devices portrayed, including an automatic gain control circuit and an edge enhancement circuit. The edge enhancement determining circuit determines a preferred amount of edge enhancement according to a monitored video signal magnitude and a programmed computer that relates the edge enhancement level with the video signal magnitude, and signals the edge enhancement circuit accordingly.

The disclosure that follows, with reference to FIG. 5, is applicable to a conventional video processing circuit such as the Hitachi DSP II digital processor circuit. The preferred video processing circuit for adaption of the edge enhancement determining circuit of this invention is a commercially available Hitachi DSP-II digital signal processor. The Hitachi DSP II processor circuit includes a microcomputer that outputs edge enhancement regulation signals to an edge enhancement circuit of the processor circuit. A program of the invention has been implemented in the memory of the microcomputer and the microcomputer responds to that program by signaling a preferred amount of regulation to the edge enhancement circuit of the digital processor circuit.

Referring to FIG. 5, a lens/imager device 200 conventionally images an object scene and produces an analog video signal 202 that corresponds to the imaged scene. An AGC circuit 204, electrically connected to the lens/imager device 200 output, conventionally processes the video signal 202 and produces an AGC conditioned analog video signal 206. An ADC circuit 208, electrically connected to the AGC circuit 204 output, conventionally converts the analog video signal 206 into a digital video signal 210.

A horizontal edge enhancement circuit 218 is electrically connected to the ADC circuit 208 output. The horizontal edge enhancement circuit 218 conventionally provides; in cooperation with first an electrically connected delay line memory 212 that conventionally provides a two pixel horizontal delay, and second a microcomputer 230 that provides to the horizontal edge enhancement circuit 218, in a manner to be presently disclosed, a signal 232*a* representative of the proportionate amount of full horizontal edge enhancement to be applied; a regulated amount of full horizontal edge enhancement 214, the amount of horizontal regulation corresponding to the value of signal 232*a*, that is summed to the digital video signal 210 to produce a digital video signal with a regulated amount of full horizontal edge enhancement.

A vertical edge enhancement circuit 220 is electrically connected to the output of the horizontal edge enhancement circuit 218. The vertical edge enhancement circuit 220 conventionally provides; in cooperation with first an electrically connected delay line memory 216 that conventionally provides a three line delay, and second the microcomputer 230 that provides to the vertical edge enhancement circuit 220, in a manner to be presently disclosed, a signal 232*b* representative of the proportionate amount of full vertical edge enhancement to be applied; a regulated amount of full vertical edge enhancement, the amount of vertical regulation corresponding to the value of signal 232*b*, that is summed to the digital video signal 214 to produce a digital video signal with a regulated amount of full horizontal edge enhancement and a regulated amount of full vertical edge enhancement.

Conventionally, a video processor circuit includes a brightness detection circuit (not shown) that senses the magnitude of the video signal and provides a measure of that magnitude (or brightness) to the AGC circuit for determination of its signal amplification. In the Hitachi DSP-II video processor circuit, a luminance processor 222 provides that sensed video magnitude signal 228 to the programmed computer 230. The program of the Hitachi DSP-II programmed computer 230 includes a program that conventionally determines the value of the proportionate amount of full horizontal edge enhancement signal 232a, and the proportionate amount of full vertical edge enhancement signal 232b, by comparing the magnitude of the video signal to a fixed threshold, and setting the value of the signals 232a and 232b to correspond to a fixed non-adaptive level of horizontal and vertical edge enhancement if the magnitude of the video signal is below the threshold, and at a null level of horizontal and vertical edge enhancement if the magnitude is at or above the threshold. The programmed computer 230 conventionally sends a representative signal of that magnitude 234 to the AGC circuit 204.

A program of the invention is resident in the microcomputer 230. That program tests the value of the video magnitude signal 228 and determines, in a manner that has already been disclosed with reference to FIG. 2, an adaptive value of the proportionate amount of both horizontal and vertical edge enhancement as a function of the magnitude of the video signal 228, by accessing a table that relates the sensed video magnitude level to the preferred proportionate level of edge enhancement, or by alternatively performing a calculation according to an analytic function. The program of the invention overrides the values of the vertical and the horizontal edge enhancement signals 232a and 232b by conventional decision logic. Alternatively the program of the invention may modify or completely replace the edge enhancement signaling program of a conventional video signal processor computer 230, to include the adaptive determination of a preferred amount of edge enhancement as a function of the magnitude of the video signal by inclusion of program instructions that alternatively calculate the edge enhancement level or access the edge enhancement level from a table. Alternatively, a separate circuit according to the invention may include its own programmed computer and may be implemented by bypassing the conventional microcomputer edge enhancement regulation signals corresponding to signals 232a and 232b.

The luminance processor 222 is electrically connected to the vertical enhancement circuit 220 and conventionally converts the digital video signal 215 into a digital luminous television signal corrected for both horizontal and vertical edge enhancement 226, and senses by a conventional brightness detection circuit the magnitude of the video signal, providing a measure of that magnitude as the magnitude signal 228 to the microcomputer 230. A color processor 224 that is electrically connected to the vertical enhancement circuit 220 conventionally converts the digital video signal 215 into a digital chrominance television signal corrected for both horizontal and vertical edge enhancement 225. The digital luminous television signal and the chrominance television signal are conventionally input into an encoder circuit and a DAC circuit, providing conventional chrominance and luminance analog video television signals.

While the present invention has been described with reference to a number of preferred embodiments, it will be understood that the invention is not limited to those precise embodiments, and that various changes and modifications may be effected therein by one skilled in the art without departing from the scope or spirit of the invention. The spirit and scope of the present invention should be determined with reference to the appended claims.

I claim:

1. An electrical imaging circuit for producing an electrical signal corresponding to a viewed scene said circuit comprising:
    edge enhancement changing means for determining an amount of edge enhancement to apply to said electrical signal;
    edge enhancement means for providing said amount of edge enhancement to said electrical signal,
    wherein said edge enhancement changing means defines said amount of edge enhancement dynamically and wherein said electrical circuit further includes an automatic gain control circuit means for providing an automatic gain control level to said electrical circuit and said edge enhancement changing means monitors said level and defines said amount of edge enhancement in response to said level.

2. The electrical circuit of claim 1 wherein said edge enhancement changing means determines a decreased amount of edge enhancement in response to a monitored increased automatic gain control level, and determines an increased amount of edge enhancement in response to a monitored decreased amount of automatic gain control level.

3. The electrical signal of claim 1 wherein said edge enhancement changing means includes a memory means for storing a correspondence between a plurality of said characteristic values and a plurality of said amount of edge enhancement, and said edge enhancement changing means determines said amount of edge enhancement by accessing from said memory a stored memory corresponding to said characteristic value.

* * * * *